US008155908B2

(12) United States Patent
Nasle et al.

(10) Patent No.: US 8,155,908 B2
(45) Date of Patent: Apr. 10, 2012

(54) SYSTEMS AND METHODS FOR REAL-TIME SYSTEM MONITORING AND PREDICTIVE ANALYSIS

(75) Inventors: Adib Nasle, Poway, CA (US); Ali Nasle, San Diego, CA (US); Kevin Meagher, Raleigh, NC (US)

(73) Assignee: Power Analytics Corporation, San Diego, CA (US)

( * ) Notice: Subject to any disclaimer, the term of this patent is extended or adjusted under 35 U.S.C. 154(b) by 0 days.

(21) Appl. No.: 12/759,061

(22) Filed: Apr. 13, 2010

(65) Prior Publication Data

US 2010/0262411 A1    Oct. 14, 2010

Related U.S. Application Data

(63) Continuation of application No. 11/674,994, filed on Feb. 14, 2007, now Pat. No. 7,826,990.

(60) Provisional application No. 60/773,560, filed on Feb. 14, 2006.

(51) Int. Cl.
*G06F 17/50* (2006.01)
*G06F 19/00* (2011.01)

(52) U.S. Cl. ........................................ 702/85
(58) Field of Classification Search ............ 702/85
See application file for complete search history.

(56) References Cited

U.S. PATENT DOCUMENTS

| | | | |
|---|---|---|---|
| 2,309,934 A | 2/1943 | Clay | |
| 5,177,695 A * | 1/1993 | Sung et al. | 700/297 |
| 5,483,463 A | 1/1996 | Qin et al. | |
| 5,539,638 A | 7/1996 | Keeler et al. | |
| 5,682,317 A * | 10/1997 | Keeler et al. | 701/101 |
| 6,002,260 A | 12/1999 | Lau et al. | |
| 6,597,999 B1 | 7/2003 | Sinha et al. | |
| 6,633,474 B1 | 10/2003 | Boudaud | |
| 6,785,592 B1 | 8/2004 | Smith et al. | |
| 6,807,494 B2 | 10/2004 | Schutzbach et al. | |
| 6,816,810 B2 | 11/2004 | Henry et al. | |
| 7,031,895 B1 | 4/2006 | Takahashi et al. | |

(Continued)

FOREIGN PATENT DOCUMENTS

EP    0845722 A2    6/1998

(Continued)

OTHER PUBLICATIONS

Extended Search Report issued by the European Patent Office in related European Application No. 07799422.6 dated Oct. 19, 2010 (6 pages).

(Continued)

*Primary Examiner* — Cindy H Khuu
(74) *Attorney, Agent, or Firm* — Procopio, Cory, Hargreaves & Savitch LLP; Noel C. Gillespie; Jonathan D. Cheng

(57) ABSTRACT

A system for providing real-time modeling of an electrical system under management is disclosed. The system includes a data acquisition component, a virtual system modeling engine, and an analytics engine. The data acquisition component is communicatively connected to a sensor configured to provide real-time measurements of data output from an element of the system. The virtual system modeling engine is configured to generate a predicted data output for the element. The analytics engine is communicatively connected to the data acquisition system and the virtual system modeling engine and is configured to monitor and analyze a difference between the real-time data output and the predicted data output.

18 Claims, 8 Drawing Sheets

U.S. PATENT DOCUMENTS

| | | | |
|---|---|---|---|
| 7,043,411 B1 | 5/2006 | Ronaldson et al. | |
| 7,200,502 B2 | 4/2007 | Gasperi et al. | |
| 7,373,283 B2 | 5/2008 | Herzog et al. | |
| 7,561,976 B2 * | 7/2009 | Bernard et al. | 702/42 |
| 2002/0035015 A1 | 3/2002 | Eich et al. | |
| 2003/0200010 A1 | 10/2003 | Chiang | |
| 2003/0205938 A1 | 11/2003 | Andarawis et al. | |
| 2004/0074453 A1 * | 4/2004 | Roelle et al. | 123/26 |
| 2004/0119434 A1 * | 6/2004 | Dadd | 318/490 |
| 2004/0176991 A1 | 9/2004 | McKennan et al. | |
| 2004/0249775 A1 | 12/2004 | Chen | |
| 2005/0007249 A1 | 1/2005 | Eryurek et al. | |
| 2005/0023996 A1 | 2/2005 | Adamson et al. | |
| 2005/0033481 A1 | 2/2005 | Budhraja | |
| 2005/0210337 A1 | 9/2005 | Chester et al. | |
| 2006/0111816 A1 | 5/2006 | Spalink et al. | |
| 2006/0178782 A1 | 8/2006 | Pechtl et al. | |
| 2009/0018746 A1 | 1/2009 | Miller et al. | |

FOREIGN PATENT DOCUMENTS

| | | | |
|---|---|---|---|
| EP | 1261096 A1 | | 11/2002 |
| WO | WO 2004/083969 | * | 9/2004 |

OTHER PUBLICATIONS

International Search Report and Written Opinion issued on Feb. 12, 2008 in corresponding application No. PCT/US2007/62153, 8 pages.

Catcher 85% Arcing Current, ArcFlashForum—forum thread [online] Jul. 24, 2007 [retrieved Dec. 2, 2008]. Retrieved from the Internet: <URL: http://www.arcflashforum.com/showthread.php?t=15>, 2 pages.

International Search Report of PCT/US2008/079601 issued on Dec. 10, 2008, 1 page.

F. Shokooh, B. Wooton, J. Qiu, "Real-Time Simulation and Supervisory Control; The Next Logical Step after System Monitoring," PCIC-96-32 (1996), 1 page.

International Search Report and Written Opinion related to PCT/US07/06195 issued Feb. 22, 2008, 9 pages.

Merrell, John, The Importance of the X/R Ratio in Low-Voltage Short Circuit Studies (Merrell) Nov. 17, 1999, [retrieved Oct. 27, 2007] Retrieved from the internet. <URL: http://www.powerstudies.com/articles/ImportanceofX-over-RRatios.pdf> entire document, especially pp. 3-6, 6 pages.

International Search Report for PCT/US07/82361 issued Jun. 25, 2008, 8 pages.

International Search Report for PCT/US07/73375 issued Jul. 1, 2008, 7 pages.

Parikh. R., Modeling, Simulation and Analysis of an Uninterruptible Power Supply. Motion Controls Research Group. 1994 IEEE. pp. 485-489.

Carati, E.G., A Robust High Performance Three-Phase Uninterruptible Power Supply. Proceedings of the 2000 IEEE International Conference on Control Applications. Sep. 25-27, 2000, 6 pages.

Koval, D.O., Evaluating the Reliability Cost of Computer System Interruptions due to Power System Disturbances. IEEE Transactions on Industry Applications. Mar./Apr. 1989, vol. 25, No. 2, pp. 248-256, 9 pages.

International Search Report for PCT/US07/73083 issued Jul. 7, 2008, 10 pages.

Gammon, et al.—"Incident Energy Factors and Simple 480-V Incident Energy Equations", IEEE 1584-2002, IEEE Industry Applications Magazine, vol. 11, pp. 23-31, Feb. 17, 2005, 9 pages.

International Search Report for PCT/US07/72539 issued Jul. 29, 2008, 6 pages.

M. Kezunovic, "Monitoring of Power System Topology in Real-Time," Symposium on Electric Power Systems Reliability, Hawai'i International Conference on System Sciences, IEEE, Jan. 2006, 10 pages.

Extended Search Report issued by the European Patent Office in related European Application No. 07757001.8 dated May 16, 2011 (13 pages).

* cited by examiner

SYSTEMS AND METHODS FOR REAL-TIME SYSTEM MONITORING AND PREDICTIVE ANALYSIS

APPLICATIONS FOR CLAIM OF PRIORITY

This application claims the benefit under 35 U.S.C. §120 of copending U.S. patent application Ser. No. 11/674,994, filed Feb. 14, 2007, and whis is issued as U.S. Pat. No. 7,826,990 on Nov. 2, 2010, entitled "SYSTEMS AND METHODS FOR REAL-TIME SYSTEM MONITORING AND PREDICTIVE ANALYSIS," which in turn claims the benefit under 35 U.S.C. §119(e) of U.S. Provisional Application No. 60/773,560, filed Feb. 14, 2006. The disclosures of the above-identified applications are incorporated herein by reference as if set forth in their entirety.

BACKGROUND

I. Field of the Invention

The present invention relates generally to computer modeling and management of systems and, more particularly, to computer simulation techniques with real-time system monitoring and prediction of electrical system performance.

II. Background of the Invention

Computer models of complex systems enable improved system design, development, and implementation through techniques for off-line simulation of the system operation. That is, system models can be created that computers can "operate" in a virtual environment to determine design parameters. All manner of systems can be modeled, designed, and operated in this way, including machinery, factories, electrical power and distribution systems, processing plants, devices, chemical processes, biological systems, and the like. Such simulation techniques have resulted III reduced development costs and superior operation.

Design and production processes have benefited greatly from such computer simulation techniques, and such techniques are relatively well developed, but such techniques have not been applied in real-time, e.g., for real-time operational monitoring and management. In addition, predictive failure analysis techniques do not generally use real-time data that reflect actual system operation. Greater efforts at real-time operational monitoring and management would provide more accurate and timely suggestions for operational decisions, and such techniques applied to failure analysis would provide improved predictions of system problems before they occur. With such improved techniques, operational costs could be greatly reduced.

For example, mission critical electrical systems, e.g., for data centers or nuclear power facilities, must be designed to ensure that power is always available. Thus, the systems must be as failure proof as possible, and many layers of redundancy must be designed in to ensure that there is always a backup in case of a failure. It will be understood that such systems are highly complex, a complexity made even greater as a result of the required redundancy. Computer design and modeling programs allow for the design of such systems by allowing a designer to model the system and simulate its operation. Thus, the designer can ensure that the system will operate as intended before the facility is constructed.

Once the facility is constructed, however, the design is typically only referred to when there is a failure. In other words, once there is failure, the system design is used to trace the failure and take corrective action; however, because such design are so complex, and there are many interdependencies, it can be extremely difficult and time consuming to track the failure and all its dependencies and then take corrective action that does not result in other system disturbances.

Moreover, changing or upgrading the system can similarly be time consuming and expensive, requiring an expert to model the potential change, e.g., using the design and modeling program. Unfortunately, system interdependencies can be difficult to simulate, making even minor changes risky.

SUMMARY

Systems and methods for monitoring and predictive analysis of systems in real-time are disclosed.

In one aspect, a system for providing real-time modeling of an electrical system under management is disclosed. The system includes a data acquisition component, a virtual system modeling engine, and an analytics engine. The data acquisition component is communicatively connected to a sensor configured to provide real-time measurements of data output form an element of the system. The virtual system modeling engine is configured to generate a predicted data output for the element. The analytics engine is communicatively connected to the data acquisition system and the virtual system modeling engine and is configured to monitor and analyze a difference between the real-time data output and the predicted data output.

In a different aspect, a data processing system for real-time monitoring and predictive analysis of an electrical system under management is disclosed. The system includes a calibration and synchronization engine and an analysis server. The calibration and synchronization engine is configured to process real-time data indicative of the electrical system status and update a virtual model of the electrical system in response to the real-time data. The analysis server is configured to compare the processed real-time data indicative of the electrical system status with the updated virtual model and produce a real-time report of the electrical system status in response to the comparison.

In another aspect, a system for providing real-time modeling of an electrical system is disclosed. The system includes a data acquisition component, a virtual system modeling engine, a virtual system modeling database, an analytics engine, and a calibration engine communicatively connected to the data acquisition component. The data acquisition component is communicatively connected to a sensor configured to provide real-time measurements of data output from an element of the electrical system. The virtual system modeling engine is configured to generate predicted data output for the same element of the electrical system. The virtual system modeling database is configured to store a virtual system model of the electrical system. The analytics engine is communicatively connected of the data acquisition system and the virtual system modeling engine and configured to monitor and determine a difference between the real-time data output and the predicted data output.

If the difference exceed an alarm condition value, the analytics engine generates a warning message. If the difference is less than the alarm condition value but greater than a set value, the analytics engine generates a virtual system model calibration request. If the difference is less than the set value, the analytics engine continues monitoring the real-time data output and the predictive data output. The calibration engine is communicatively connected to the data acquisition component, the virtual system modeling engine, the virtual system modeling database, and the analytics engine. The calibration engine is further configured to receive the calibration request from the analytics engine and update operational parameters of the virtual system modeling engine and the virtual system model upon receipt of the calibration request.

In still another embodiment, a system for providing real-time modeling of an electrical system is disclosed. The system includes a data acquisition component, a virtual system modeling database, an analytics engine, and a calibration engine. The data acquisition component is communicatively connected to sensors configured to provide real-time data of ambient environmental conditions impacting the electrical system. The virtual system modeling database is configured to store a virtual system model of the electrical system, wherein the virtual system model includes preset values for the environmental conditions impacting the electrical system. The analytics engine is communicatively connected to the data acquisition component and the virtual system modeling engine and is configured to monitor and determine a difference between the real-time ambient environmental data and the preset environmental values.

If the difference exceeds an alarm condition value, the analytics engine generates a warning message. If the difference is less than the alarm condition value but greater than a set value, the analytics engine generates a virtual system model calibration request. If the difference is less than the set value, the analytics engine continues monitoring the real-time ambient environmental data and the preset environmental values. The calibration engine is communicatively connected to the data acquisition component, the virtual system modeling database, and the analytics engine. The calibration engine is configured to receive the calibration request from the analytics engine and update the preset environmental values upon receipt of the calibration request.

In yet another embodiment, a method for real-time monitoring and predictive analysis of an electrical system under management is disclosed. Real-time data indicative of the electrical system status is processed to enable a virtual model of the electrical system under management to be calibrated and synchronized with the real-time data. The virtual model of the electrical system under management is updated in response to the real-time data. The processed real-time data indicative of the electrical system status is compared with corresponding output values of the updated virtual model to generate a real-time report of the system status in response to the comparison.

In a separate aspect, a method for managing real-time updates to a virtual system model of an electrical system is disclosed. Real-time data output from a sensor interfaced with the electrical system is received. The real-time data is processed into a defined format. Predicted system data for the electrical system is generated using a virtual system model of the electrical system. A determination is made as to whether a difference between the real-time data output and the predicted system data falls between a set value and an alarm condition. If the difference does fall between the set value and alarm condition value, a virtual system calibration request is generated.

In a different aspect, a method for synchronizing real-time system data with a virtual system model of an electrical system is disclosed. A virtual system model request is received. A predicted system output value for the virtual system model is updated with a real-time system output value from the electrical system. A difference between a real-time sensor measurement from a sensor integrated with the electrical system and a predicted sensor value for the sensor is determined. Operating parameters of the virtual system model is adjusted to minimize the difference.

These and other features, aspects, and embodiments of the invention are described below in the section entitled "Detailed Description."

BRIEF DESCRIPTION OF THE DRAWINGS

For a more complete understanding of the principles disclosed herein, and the advantages thereof, reference is now made to the following descriptions taken in conjunction with the accompanying drawings, in which.

DETAILED DESCRIPTION

Systems and methods for monitoring and predictive analysis of systems in real-time are disclosed. It will be clear, however, that the present invention may be practiced without some or all of these specific details. In other instances, well known process operations have not been described in detail in order not to unnecessarily obscure the present invention.

As used herein, a system denotes a set of components, real or abstract, comprising a whole where each component interacts with or is related to at least one other component within the whole. Examples of systems include machinery, factories, electrical systems, processing plants, devices, chemical processes, biological systems, data centers, aircraft carriers, and the like. An electrical system can designate a power generation and/or distribution system that is widely dispersed (i.e., power generation, transformers, and/or electrical distribution components distributed geographically throughout a large region) or bounded within a particular location (e.g., a power plant within a production facility, a bounded geographic area, on board a ship, etc.).

A network application is any application that is stored on an application server connected to a network (e.g., local area network, wide area network, etc.) in accordance with any contemporary client/server architecture model and can be accessed via the network. In this arrangement, the network application programming interface (API) resides on the application server separate from the client machine. The client interface would typically be a web browser (e.g. INTERNET EXPLORER™, FIREFOX™, NETSCAPE™, etc.) that is in communication with the network application server via a network connection (e.g., HTTP, HTTPS, RSS, etc.).

Figure 1:
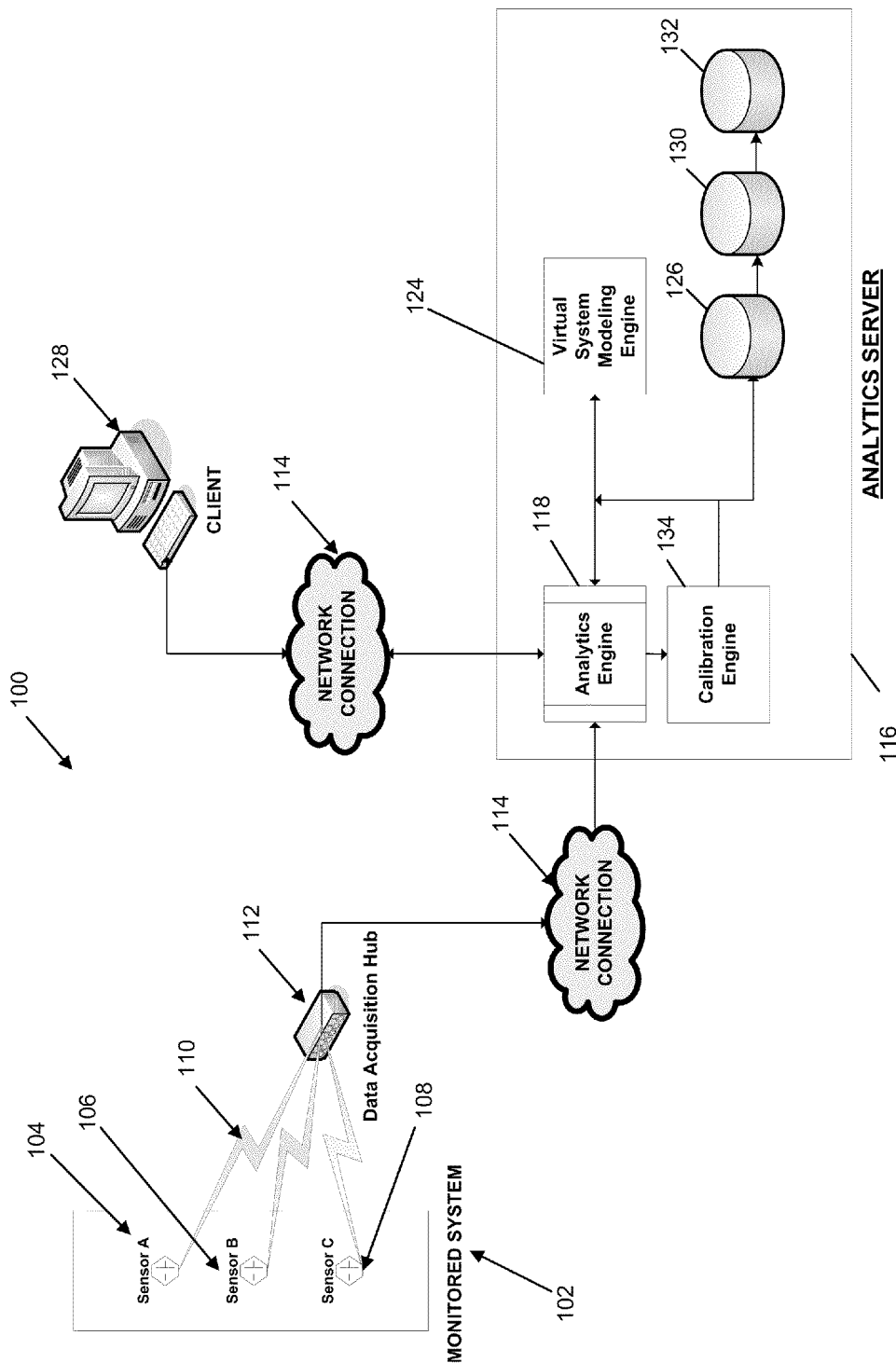
FIG. 1 is an illustration of a system for utilizing real-time data for predictive analysis of the performance of a monitored system, in accordance with one embodiment.

FIG. 1 is an illustration of a system for utilizing real-time data for predictive analysis of the performance of a monitored system, in accordance with one embodiment. As shown herein, the system 100 includes a series of sensors (i.e., Sensor A 104, Sensor B 106, Sensor C 108) interfaced with the various components of a monitored system 102, a data acquisition hub 112, an analytics server 116, and a thin-client device 128. In one embodiment, the monitored system 102 is an electrical power generation plant. In another embodiment, the monitored system 102 is an electrical power transmission infrastructure. In still another embodiment, the monitored system 102 is an electrical power distribution system. In still another embodiment, the monitored system 102 includes a combination of one or more electrical power generation plant (s), power transmission infrastructure(s), and/or an electrical power distribution system. It should be understood that the monitored system 102 can be any combination of components whose operations can be monitored with conventional sensors and where each component interacts with or is related to at least one other component within the combination. For a monitored system 102 that is an electrical power generation, transmission, or distribution system, the sensors can provide data such as voltage, frequency, current, load, power factor, and the like.

The sensors are configured to provide output values for system parameters that indicate the operational status and/or "health" of the monitored system 102. For example, in an electrical power generation system, the current output or voltage readings for the various components that comprise the power generation system is indicative of the overall health and/or operational condition of the system. In one embodiment, the sensors are configured to also measure additional data that can affect system operation. For example, for an electrical power distribution system, the sensor output can include environmental information, e.g., temperature, humidity, etc., which can impact electrical power demand and can also affect the operation and efficiency of the power distribution system itself.

Continuing with FIG. 1, in one embodiment, the sensors are configured to output data in an analog format. For example, electrical power sensor measurements (e.g., voltage, current, etc.) are sometimes conveyed in an analog format as the measurements may be continuous in both time and amplitude. In another embodiment, the sensors are configured to output data in a digital format. For example, the same electrical power sensor measurements may be taken in discrete time increments that are not continuous in time or amplitude. In still another embodiment, the sensors are configured to output data in either an analog or digital format depending on the sampling requirements of the monitored system 102.

The sensors can be configured to capture output data at split-second intervals to effectuate "real time" data capture. For example, in one embodiment, the sensors can be configured to generate hundreds of thousands of data readings per second. It should be appreciated, however, that the number of data output readings taken by a sensor may be set to any value as long as the operational limits of the sensor and the data processing capabilities of the data acquisition hub 112 are not exceeded.

Still with FIG. 1, each sensor is communicatively connected to the data acquisition hub 112 via an analog or digital data connection 110. The data acquisition hub 112 may be a standalone unit or integrated within the analytics server 116 and can be embodied as a piece of hardware, software, or some combination thereof. In one embodiment, the data connection 110 is a "hard wired" physical data connection (e.g., serial, network, etc.). For example, a serial or parallel cable connection between the sensor and the hub 112. In another embodiment, the data connection 110 is a wireless data connection. For example, a radio frequency (RF), BLUETOOTH™, infrared or equivalent connection between the sensor and the hub 112.

The data acquisition hub 112 is configured to communicate "real-time" data from the monitored system 102 to the analytics server 116 using a network connection 114. In one embodiment, the network connection 114 is a "hardwired" physical connection. For example, the data acquisition hub 112 may be communicatively connected (via Category 5 (CAT5), fiber optic or equivalent cabling) to a data server (not shown) that is communicatively connected (via CAT5, fiber optic or equivalent cabling) through the Internet and to the analytics server 116 server. The analytics server 116 being also communicatively connected with the Internet (via CAT5, fiber optic, or equivalent cabling). In another embodiment, the network connection 114 is a wireless network connection (e.g., Wi-Fi, WLAN, etc.). For example, utilizing a 802.11b/g or equivalent transmission format. In practice, the network connection utilized is dependent upon the particular requirements of the monitored system 102.

Data acquisition hub 112 can also be configured to supply warning and alarms signals as well as control signals to monitored system 102 and/or sensors 104, 106, and 108 as described in more detail below.

As shown in FIG. 1, in one embodiment, the analytics server 116 hosts an analytics engine 118, virtual system modeling engine 124 and several databases 126, 130, and 132. The virtual system modeling engine can, e.g., be a computer modeling system, such as described above. In this context, however, the modeling engine can be used to precisely model and mirror the actual electrical system. Analytics engine 118 can be configured to generate predicted data for the monitored system and analyze difference between the predicted data and the real-time data received from hub 112.

Figure 2:
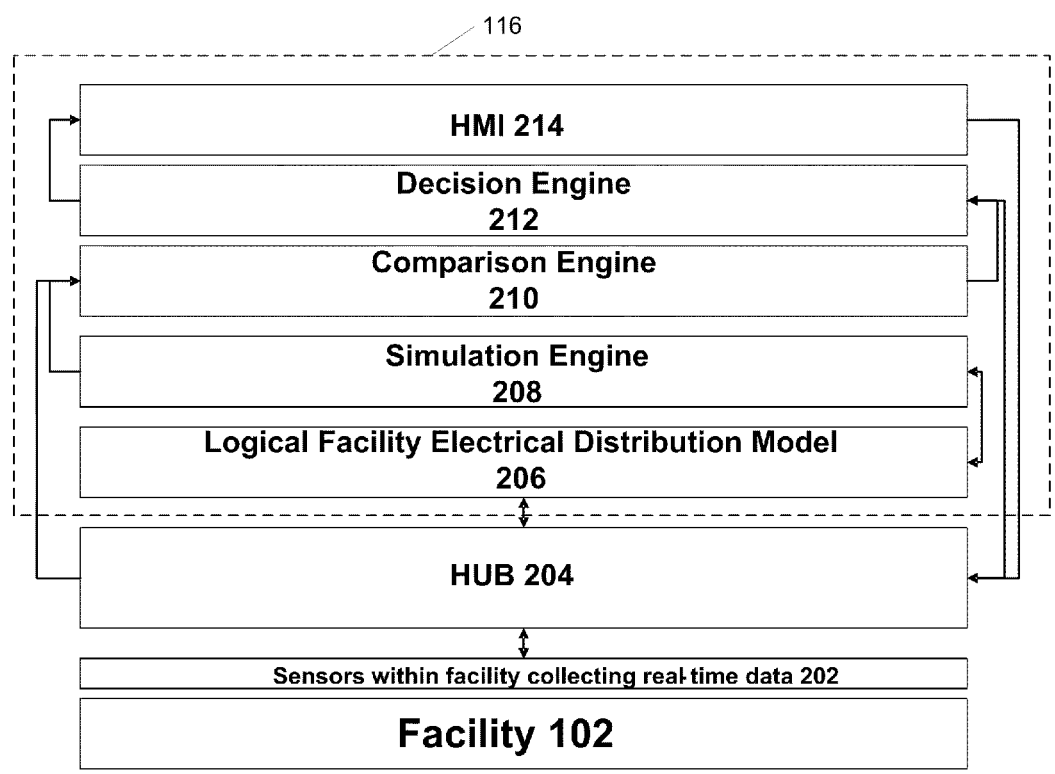
FIG. 2 is a diagram illustrating a detailed view of a analytics server included in the system of FIG. 1.

FIG. 2 is a diagram illustrating a more detailed view of analytic server 116. As can be seen, analytic server 116 is interfaced with a monitored facility 102 via sensors 202, e.g., sensors 104, 106, and 108. Sensors 202 are configured to supply real-time data from within monitored facility 102. The real-time data is communicated to analytic server 116 via a hub 204. Hub 204 can be configured to provide real-time data to server 116 as well as alarming, sensing and control featured for facility 102.

The real-time data from hub 204 can be passed to a comparison engine 210, which can form part of analytics engine 118. Comparison engine 210 can be configured to continuously compare the real-time data with predicted values generated by simulation engine 208. Based on the comparison, comparison engine 210 can be further configured to determine whether deviations between the real-time and the expected values exists, and if so to classify the deviation, e.g., high, marginal, low, etc. The deviation level can then be communicated to decision engine 212, which can also comprise part of analytics engine 118.

Decision engine 212 can be configured to look for significant deviations between the predicted values and real-time values as received from the comparison engine 210. If significant deviations are detected, decision engine 212 can also be configured to determine whether an alarm condition exists, activate the alarm and communicate the alarm to Human-Machine Interface (HMI) 214 for display in real-time via, e.g., thin client 128. Decision engine 212 can also be configured to perform root cause analysis for significant deviations in order to determine the interdependencies and identify the parent-child failure relationships that may be occurring. In this manner, parent alarm conditions are not drowned out by multiple children alarm conditions, allowing the user/operator to focus on the main problem, at least at first.

Thus, in one embodiment, and alarm condition for the parent can be displayed via HMI 214 along with an indication that processes and equipment dependent on the parent process or equipment are also in alarm condition. This also means that server 116 can maintain a parent-child logical relationship between processes and equipment comprising facility 102. Further, the processes can be classified as critical, essential, non-essential, etc.

Decision engine 212 can also be configured to determine health and performance levels and indicate these levels for the various processes and equipment via HMI 214. All of which, when combined with the analytic capabilities of analytics engine 118 allows the operator to minimize the risk of catastrophic equipment failure by predicting future failures and providing prompt, informative information concerning potential/predicted failures before they occur. Avoiding catastrophic failures reduces risk and cost, and maximizes facility performance and up time.

Simulation engine 208 operates on complex logical models 206 of facility 102. These models are continuously and automatically synchronized with the actual facility status based on the real-time data provided by hub 204. In other words, the models are updated based on current switch status, breaker status, e.g., open-closed, equipment on/off status, etc. Thus, the models are automatically updated based on such status, which allows simulation engine to produce predicted data based on the current facility status. This in turn, allows accurate, and meaningful comparisons of the real-time data to the predicted data.

Example models 206 that can be maintained and used by server 116 include power flow models used to calculate expected Kw, Kvar, power factor values, etc., short circuit models used to calculate maximum and minimum available fault currents, protection models used to determine proper protection schemes and ensure selective coordination of protective devices, power quality models used to determine voltage and current distortions at any point in the network, to name just a few. It will be understood that different models can be used depending on the system being modeled.

In certain embodiments, hub 204 is configured to supply equipment identification associated with the real-time data. This identification can be cross referenced with identifications provided in the models.

In one embodiment, if the comparison performed by comparison engine 210 indicates that the differential between the real-time sensor output value and the expected value exceeds a Defined Difference Tolerance (DDT) value (i.e., the "real-time" output values of the sensor output do not indicate an alarm condition) but below an alarm condition (i.e., alarm threshold value), a calibration request is generated by the analytics engine 118. If the differential exceeds, the alarm condition, an alarm or notification message is generated by the analytics engine 118. If the differential is below the DTT value, the analytics engine does nothing and continues to monitor the real-time data and expected data.

In one embodiment, the alarm or notification message is sent directly to the client (i.e., user) 128, e.g., via HMI 214, for display in real-time on a web browser, pop-up message box, e-mail, or equivalent on the client 128 display panel. In another embodiment, the alarm or notification message is sent to a wireless mobile device (e.g., BLACKBERRY™, laptop, pager, etc.) to be displayed for the user by way of a wireless router or equivalent device interfaced with the analytics server 116. In still another embodiment, the alarm or notification message is sent to both the client 128 display and the wireless mobile device. The alarm can be indicative of a need for a repair event or maintenance to be done on the monitored system. It should be noted, however, that calibration requests should not be allowed if an alarm condition exists to prevent the models form being calibrated to an abnormal state.

Once the calibration is generated by the analytics engine 118, the various operating parameters or conditions of model (s) 206 can be updated or adjusted to reflect the actual facility configuration. This can include, but is not limited to, modifying the predicted data output from the simulation engine 208, adjusting the logic/processing parameters utilized by the model(s) 206, adding/subtracting functional elements from model(s) 206, etc. It should be understood, that any operational parameter of models 206 can be modified as long as the resulting modifications can be processed and registered by simulation engine 208.

Referring back to FIG. 1, models 206 can be stored in the virtual system model database 126. As noted, a variety of conventional virtual model applications can be used for creating a virtual system model, so that a wide variety of systems and system parameters can be modeled. For example, in the context of an electrical power distribution system, the virtual system model can include components for modeling reliability, modeling output voltage stability, and modeling power flow. In addition, models 206 can include dynamic control logic that permits a user to configure the models 206 by specifying control algorithms and logic blocks in addition to combinations and interconnections of generators, governors, relays, breakers, transmission line, and the like. The voltage stability parameters can indicate capacity in terms of size, supply, and distribution, and can indicate availability in terms of remaining capacity of the presently configured system. The power flow model can specify voltage, frequency, and power factor, thus representing the "health" of the system.

All of models 206 can be referred to as a virtual system model. Thus, virtual system model database can be configured to store the virtual system model. A duplicate, but synchronized copy of the virtual system model can be stored in a virtual simulation model database 130. This duplicate model can be used for what-if simulations. In other words, this model can be used to allow a system designer to make hypothetical changes to the facility and test the resulting effect, without taking down the facility or costly and time consuming analysis. Such hypothetical can be used to learn failure patterns and signatures as well as to test proposed modifications, upgrades, additions, etc., for the facility. The real-time data, as well as trending produced by analytics engine 118 can be stored in a real-time data acquisition database 132.

As discussed above, the virtual system model is periodically calibrated and synchronized with "real-time" sensor data outputs so that the virtual system model provides data output values that are consistent with the actual "real-time" values received from the sensor output signals. Unlike conventional systems that use virtual system models primarily for system design and implementation purposes (i.e., offline simulation and facility planning), the virtual system models described herein are updated and calibrated with the real-time system operational data to provide better predictive output values. A divergence between the real-time sensor output values and the predicted output values generate either an alarm condition for the values in question and/or a calibration request.

Continuing with FIG. 1, the analytics engine 118 can be configured to implement pattern/sequence recognition into a real-time decision loop that, e.g., is enabled by a new type of machine learning called associative memory, or hierarchical temporal memory (HTM), which is a biological approach to learning and pattern recognition. Associative memory allows storage, discovery, and retrieval of learned associations between extremely large numbers of attributes in real time. At a basic level, an associative memory stores information about how attributes and their respective features occur together. The predictive power of the associative memory technology comes from its ability to interpret and analyze these co-occurrences and to produce various metrics. Associative memory is built through "experiential" learning in which each newly observed state is accumulated in the associative memory as a basis for interpreting future events. Thus, by observing normal system operation over time, and the normal predicted system operation over time, the associative memory is able to learn normal patterns as a basis for identifying non-normal behavior and appropriate responses, and to associate patterns with particular outcomes, contexts or responses. The analytics engine 118 is also better able to understand component mean time to failure rates through observation and system availability characteristics. This technology in combination with the virtual system model can be characterized as a "neocortical" model of the system under management.

This approach also presents a novel way to digest and comprehend alarms in a manageable and coherent way. The neocortical model could assist in uncovering the patterns and sequencing of alarms to help pinpoint the location of the (impending) failure, its context, and even the cause. Typically, responding to the alarms is done manually by experts who have gained familiarity with the system through years of experience. However, at times, the amount of information is so great that an individual cannot respond fast enough or does not have the necessary expertise. An "intelligent" system like the neocortical system that observes and recommends possible responses could improve the alarm management process by either supporting the existing operator, or even managing the system autonomously.

Current simulation approaches for maintaining transient stability involve traditional numerical techniques and typically do not test all possible scenarios. The problem is further complicated as the numbers of components and pathways increase. Through the application of the neocortical model, by observing simulations of circuits, and by comparing them to actual system responses, it may be possible to improve the simulation process, thereby improving the overall design of future circuits.

The virtual system model database 126, as well as databases 130 and 132, can be configured to store one or more virtual system models, virtual simulation models, and real-time data values, each customized to a particular system being monitored by the analytics server 116. Thus, the analytics server 116 can be utilized to monitor more than one system at a time. As depicted herein, the databases 126, 130, and 132 can be hosted on the analytics server 116 and communicatively interfaced with the analytics engine 118. In other embodiments, databases 126, 130, and 132 can be hosted on a separate database server (not shown) that is communicatively connected to the analytics server 116 in a manner that allows the virtual system modeling engine 124 and analytics engine 118 to access the databases as needed.

Therefore, in one embodiment, the client 128 can modify the virtual system model stored on the virtual system model database 126 by using a virtual system model development interface using well-known modeling tools that are separate from the other network interfaces. For example, dedicated software applications that run in conjunction with the network interface to allow a client 128 to create or modify the virtual system models.

The client 128 may utilize a variety of network interfaces (e.g., web browser, CITRIX™, WINDOWS TERMINAL SERVICES™, telnet, or other equivalent thin-client terminal applications, etc.) to access, configure, and modify the sensors (e.g., configuration files, etc.), analytics engine 118 (e.g., configuration files, analytics logic, etc.), calibration parameters (e.g., configuration files, calibration parameters, etc.), virtual system modeling engine 124 (e.g., configuration files, simulation parameters, etc.) and virtual system model of the system under management (e.g., virtual system model operating parameters and configuration files). Correspondingly, data from those various components of the monitored system 102 can be displayed on a client 128 display panel for viewing by a system administrator or equivalent.

Figure 3:
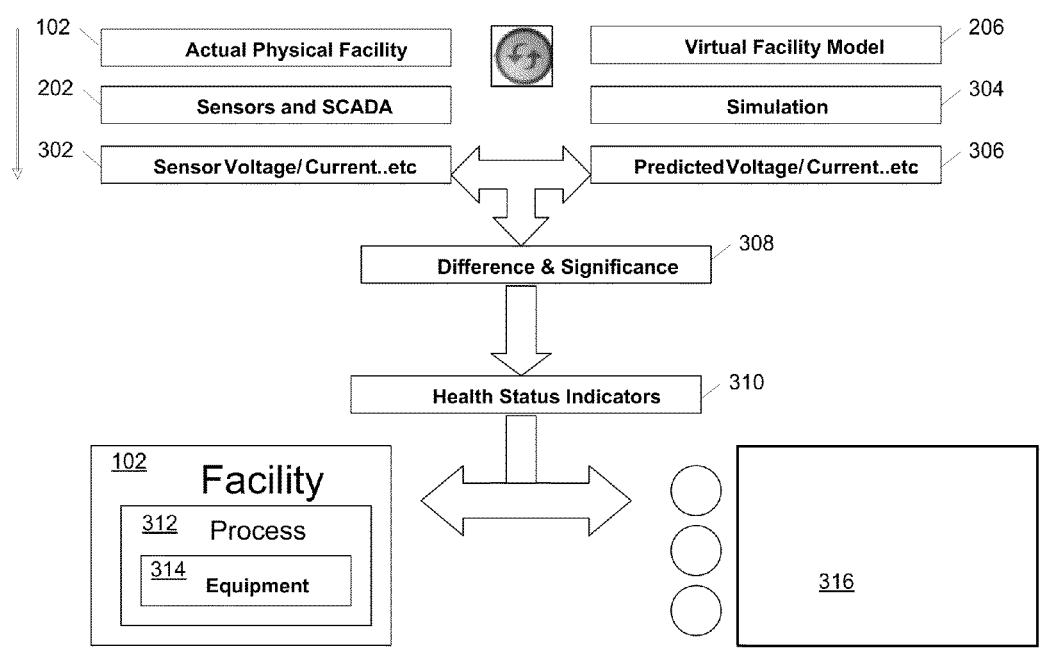
FIG. 3 is a diagram illustrating how the system of FIG. 1 operates to synchronize a the operating parameters between a physical facility and a virtual system model of the facility.

As described above, server 116 is configured to synchronize the physical world with the virtual and report, e.g., via visual, real-time display, deviations between the two as well as system health, alarm conditions, predicted failures, etc. This is illustrated with the aid of FIG. 3, in which the synchronization of the physical world (left side) and virtual world (right side) is illustrated. In the physical world, sensors 202 produce real-time data 302 for the processes 312 and equipment 314 that make up facility 102. In the virtual world, simulations 304 of the virtual system model 206 provide predicted values 306, which are correlated and synchronized with the real-time data 302. The real-time data can then be compared to the predicted values so that differences 308 can be detected. The significance of these difference can determine the health status 310 of the system. The health status can then be communicated to the processes 312 and equipment 314, e.g., via alarms and indicators, as well as to thin client 128, e.g., via web pages 316.

Figure 4:
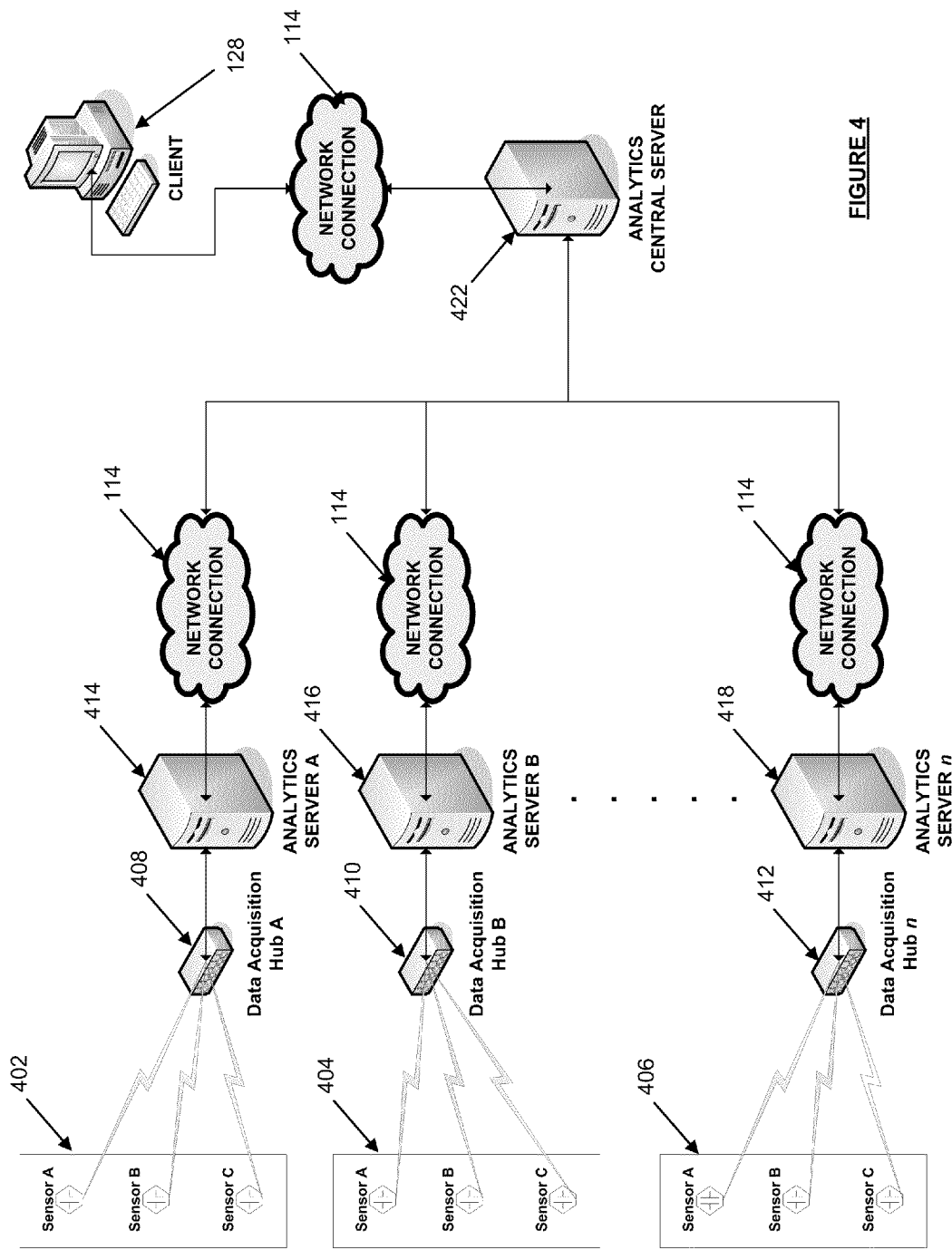
FIG. 4 is an illustration of the scalability of a system for utilizing real-time data for predictive analysis of the performance of a monitored system, in accordance with one embodiment.

FIG. 4 is an illustration of the scalability of a system for utilizing real-time data for predictive analysis of the performance of a monitored system, in accordance with one embodiment. As depicted herein, an analytics central server 422 is communicatively connected with analytics server A 414, analytics server B 416, and analytics server n 418 (i.e., one or more other analytics servers) by way of one or more network connections 114. Each of the analytics servers is communicatively connected with a respective data acquisition hub (i.e., Hub A 408, Hub B 410, Hub n 412) that communicates with one or more sensors that are interfaced with a system (i.e., Monitored System A 402, Monitored System B 404, Monitored System n 406) that the respective analytical server monitors. For example, analytics server A 414 is communicatively connected with data acquisition hub A 408, which communicates with one or more sensors interfaced with monitored system A 402.

Each analytics server (i.e., analytics server A 414, analytics server B 416, analytics server n 418) is configured to monitor the sensor output data of its corresponding monitored system and feed that data to the central analytics server 422. Additionally, each of the analytics servers can function as a proxy agent of the central analytics server 422 during the modifying and/or adjusting of the operating parameters of the system sensors they monitor. For example, analytics server B 416 is configured to be utilized as a proxy to modify the operating parameters of the sensors interfaced with monitored system B 404.

Moreover, the central analytics server 422, which is communicatively connected to one or more analytics server(s) can be used to enhance the scalability. For example, a central analytics server 422 can be used to monitor multiple electrical power generation facilities (i.e., monitored system A 402 can be a power generation facility located in city A while monitored system B 404 is a power generation facility located in city B) on an electrical power grid. In this example, the number of electrical power generation facilities that can be monitored by central analytics server 422 is limited only by the data processing capacity of the central analytics server 422. The central analytics server 422 can be configured to enable a client 128 to modify and adjust the operational parameters of any the analytics servers communicatively connected to the central analytics server 422. Furthermore, as discussed above, each of the analytics servers are configured to serve as proxies for the central analytics server 422 to enable a client 128 to modify and/or adjust the operating parameters of the sensors interfaced with the systems that they respectively monitor. For example, the client 128 can use the central analytics server 422, and vice versa, to modify and/or adjust the operating parameters of analytics server A 414 and utilize the same to modify and/or adjust the operating parameters of the sensors interfaced with monitored system A 402. Additionally, each of the analytics servers can be configured to allow a client 128 to modify the virtual system model through a virtual system model development interface using well-known modeling tools.

In one embodiment, the central analytics server 422 can function to monitor and control a monitored system when its corresponding analytics server is out of operation. For example, central analytics server 422 can take over the functionality of analytics server B 416 when the server 416 is out of operation. That is, the central analytics server 422 can monitor the data output from monitored system B 404 and modify and/or adjust the operating parameters of the sensors that are interfaced with the system 404.

In one embodiment, the network connection 114 is established through a wide area network (WAN) such as the Internet. In another embodiment, the network connection is established through a local area network (LAN) such as the company intranet. In a separate embodiment, the network connection 114 is a "hardwired" physical connection. For example, the data acquisition hub 112 may be communicatively connected (via Category 5 (CAT5), fiber optic or equivalent cabling) to a data server that is communicatively connected (via CAT5, fiber optic or equivalent cabling) through the Internet and to the analytics server 116 server hosting the analytics engine 118. In another embodiment, the network connection 114 is a wireless network connection (e.g., Wi-Fi, WLAN, etc.). For example, utilizing a 802.11b/g or equivalent transmission format.

In certain embodiments, regional analytics servers can be placed between local analytics servers 414, 416, . . . , 418 and central analytics server 422. Further, in certain embodiments a disaster recover cite can be included at the central analytics server 422 level.

Figure 5:
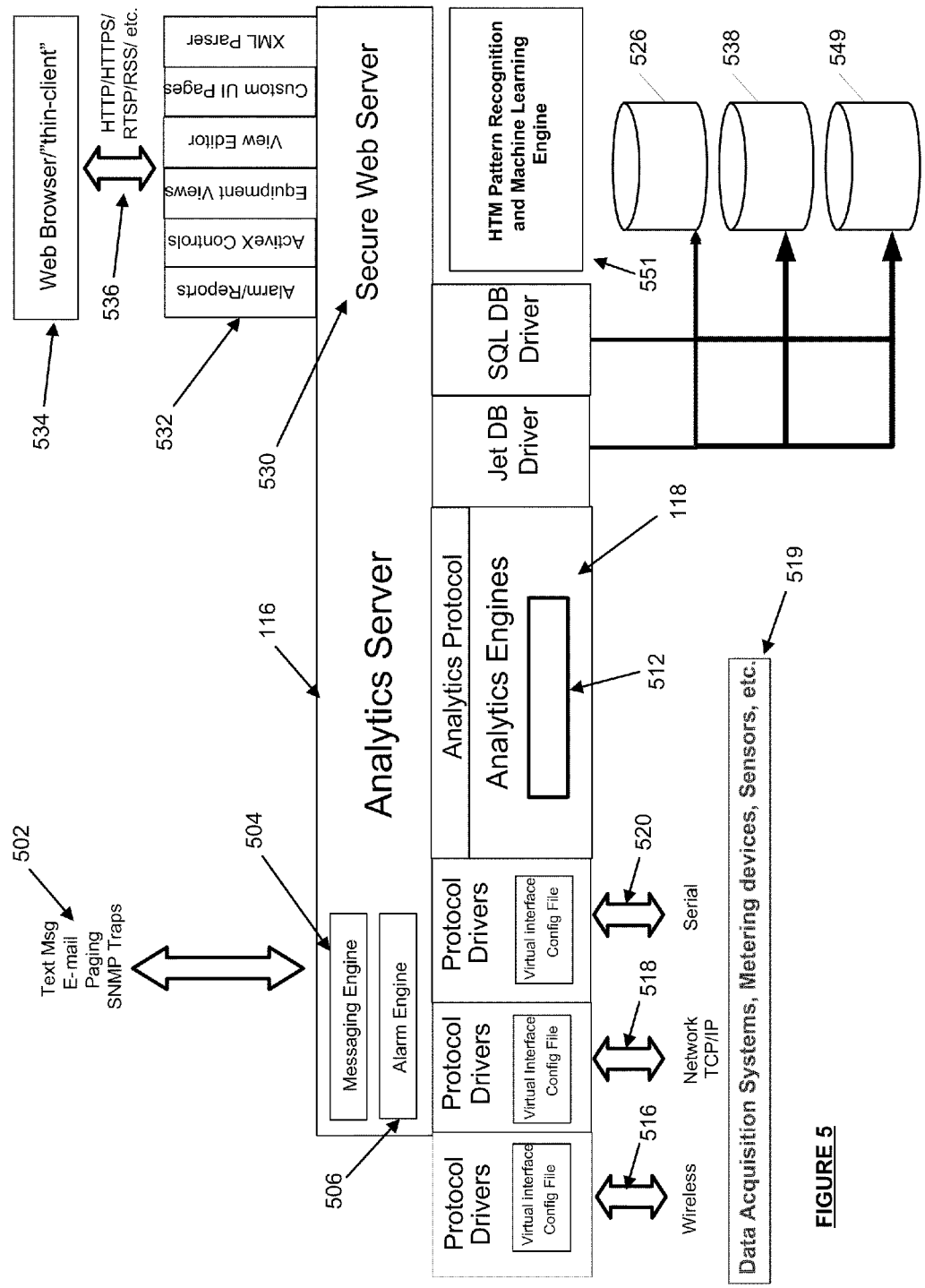
FIG. 5 is a block diagram that shows the configuration details of the system illustrated in FIG. 1, in accordance with one embodiment.

FIG. 5 is a block diagram that shows the configuration details of analytics server 116 illustrated in FIG. 1 in more detail. It should be understood that the configuration details in FIG. 5 are merely one embodiment of the items described for FIG. 1, and it should be understood that alternate configurations and arrangements of components could also provide the functionality described herein.

The analytics server 116 includes a variety of components. In the FIG. 6 embodiment, the analytics server 116 is implemented in a Web-based configuration, so that the analytics server 116 includes (or communicates with) and secure web server 530 for communication with the sensor systems 519 (e.g., data acquisition units, metering devices, sensors, etc.) and external communication entities 534 (e.g., web browser, "thin client" applications, etc.). A variety of user views and functions 532 are available to the client 128 such as: alarm reports, Active X controls, equipment views, view editor tool, custom user interface page, and XML parser. It should be appreciated, however, that these are just examples of a few in a long list of views and functions 532 that the analytics server 116 can deliver to the external communications entities 534 and are not meant to limit the types of views and functions 532 available to the analytics server 116 in any way.

The analytics server 116 also includes an alarm engine 506 and messaging engine 504, for the aforementioned external communications. The alarm engine 506 is configured to work in conjunction with the messaging engine 504 to generate alarm or notification messages 502 (in the form of text messages, e-mails, paging, etc.) in response to the alarm conditions previously described. The analytics server 116 determines alarm conditions based on output data it receives from the various sensor systems 519 through a communications connection (e.g., wireless 516, TCP/IP 518, Serial 520, etc) and simulated output data from a virtual system model 512, of the monitored system, processed by the analytics engine 118. In one embodiment, the virtual system model 512 is created by a user through interacting with an external communication entity 534 by specifying the components that comprise the monitored system and by specifying relationships between the components of the monitored system. In another embodiment, the virtual system model 512 is automatically generated by the analytics engine 118 as components of the monitored system are brought online and interfaced with the analytics server 116.

Continuing with FIG. 5, a virtual system model database 526 is communicatively connected with the analytics server 116 and is configured to store one or more virtual system model 512, each of which, represents a particular monitored system. For example, the analytics server 116 can conceivably monitor multiple electrical power generation systems (e.g., system A, system B, system C, etc.) spread across a wide geographic area (e.g., City A, City B, City C, etc.). Therefore, the analytics server 116 will utilize a different virtual system model 512 for each of the electrical power generation systems that it monitors. Virtual simulation model database 538 can be configured to store a synchronized, duplicate copy of the virtual system model 512, and real-time data acquisition database 549 can store the real-time and trending data for the system(s) being monitored.

Thus, in operation, analytics server 116 can receive real-time data for various sensors, i.e., components, through data acquisition system 202. As can be seen, analytics server 116 can comprise various drivers configured to interface with the various types of sensors, etc., comprising data acquisition system 202. This data represents the real-time operational data for the various components. For example, the data may indicate that a certain component is operating at a certain voltage level and drawing certain amount of current. This information can then be fed to a modeling engine to generate a virtual system model 512 that is based on the actual real-time operational data.

Analytics engine 118 can be configured to compare predicted data based on the virtual system model 512 with real-time data received from data acquisition system 202 and to identify any differences. In some instances, analytics engine can be configured to identify these differences and then update, i.e., calibrate, the virtual system model 512 for use in future comparisons. In this manner, more accurate comparisons and warnings can be generated.

But in other instances, the differences will indicate a failure, or the potential for a failure. For example, when a component begins to fail, the operating parameters will begin to change. This change may be sudden or it may be a progressive change over time. Analytics engine 118 can detect such changes and issue warnings that can allow the changes to be detected before a failure occurs. The analytic engine 118 can be configured to generate warnings that can be communicated via interface 532.

For example, a user can access information from server 116 using thin client 534. For example, reports can be generate and served to thin client 534 via server 530. These reports can, for example, comprise schematic or symbolic illustrations of the system being monitored. Status information for each component can be illustrated or communicated for each component. This information can be numerical, i.e., the voltage or current level. Or it can be symbolic, i.e., green for normal, red for failure or warning. In certain embodiments, intermediate levels of failure can also be communicated, i.e., yellow can be used to indicate operational conditions that project the potential for future failure. It should be noted that this information can be accessed in real-time. Moreover, via thin client 534, the information can be accessed from anywhere and anytime.

Figure 6:
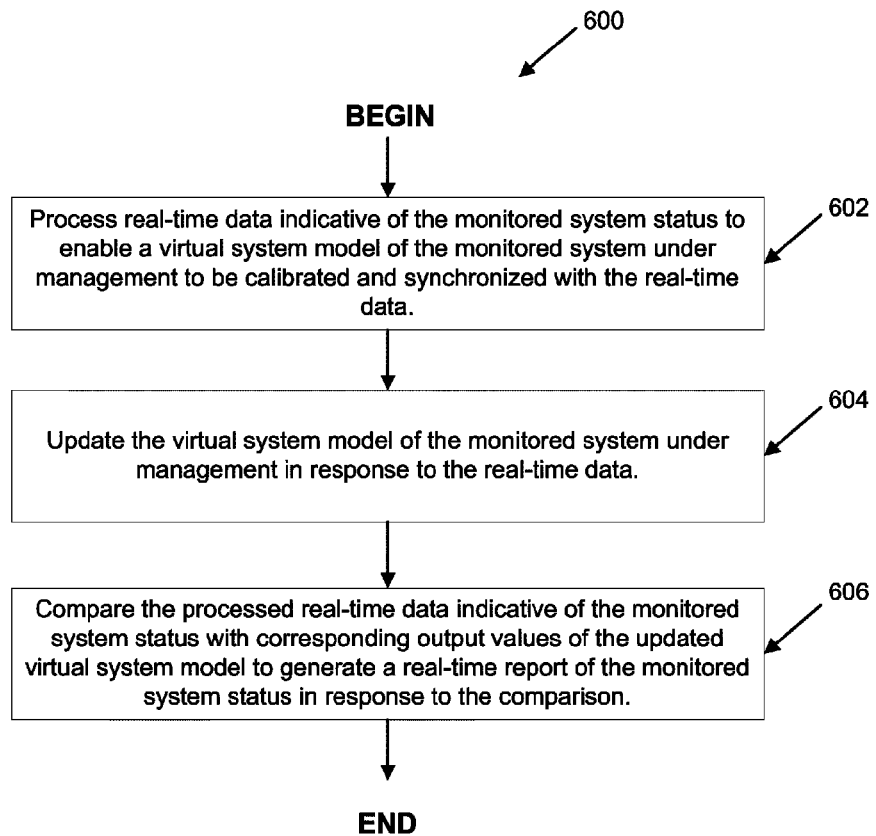
FIG. 6 is an illustration of a flowchart describing a method for real-time monitoring and predictive analysis of a monitored system, in accordance with one embodiment.

FIG. 6 is an illustration of a flowchart describing a method for real-time monitoring and predictive analysis of a monitored system, in accordance with one embodiment. Method 600 begins with operation 602 where real-time data indicative of the monitored system status is processed to enable a virtual model of the monitored system under management to be calibrated and synchronized with the real-time data. In one embodiment, the monitored system 102 is a mission critical electrical power system. In another embodiment, the monitored system 102 can include an electrical power transmission infrastructure. In still another embodiment, the monitored system 102 includes a combination of thereof. It should be understood that the monitored system 102 can be any combination of components whose operations can be monitored with conventional sensors and where each component interacts with or is related to at least one other component within the combination.

Method 600 moves on to operation 604 where the virtual system model of the monitored system under management is updated in response to the real-time data. This may include, but is not limited to, modifying the simulated data output from the virtual system model, adjusting the logic/processing parameters utilized by the virtual system modeling engine to simulate the operation of the monitored system, adding/subtracting functional elements of the virtual system model, etc. It should be understood, that any operational parameter of the virtual system modeling engine and/or the virtual system model may be modified by the calibration engine as long as the resulting modifications can be processed and registered by the virtual system modeling engine.

Method 600 proceeds on to operation 606 where the simulated real-time data indicative of the monitored system status is compared with a corresponding virtual system model created at the design stage. The design stage models, which may be calibrated and updated based on real-time monitored data, are used as a basis for the predicted performance of the system. The real-time monitored data can then provide the actual performance over time. By comparing the real-time data with the predicted performance information, differences can be identified and tracked by, e.g., the analytics engine 118. Analytics engine 118 can then track trends, determine alarm states, etc., and generate a real-time report of the system status in response to the comparison. The real-time report can relate to capacity and voltage stability of electrical distribution lines of the system under management. Alternatively, the real-time report may relate to power flow and loading of electrical distribution lines of the system under management, or may relate to arc flash energy and arc heat exposure. The real-time report may relate to dynamic behavior response and strength of the system under management as a function of system exposure to external events.

In other words, the analytics can be used to analyze the comparison and real-time data and determine if there is a problem that should be reported and what level the problem may be, e.g., low priority, high priority, critical, etc. The analytics can also be used to predict future failures and time to failure, etc. In one embodiment, reports can be displayed on a conventional web browser (e.g. INTERNET EXPLORER™, FIREFOX™, NETSCAPE™, etc) that is rendered on a standard personal computing (PC) device. In another embodiment, the "real-time" report can be rendered on a "thin-client" computing device (e.g., CITRIX™, WINDOWS TERMINAL SERVICES™, telnet, or other equivalent thin-client terminal application). In still another embodiment, the report can be displayed on a wireless mobile device (e.g., BLACKBERRY™, laptop, pager, etc.). For example, in one embodiment, the "real-time" report can include such information as the differential in a particular power parameter (i.e., current, voltage, etc.) between the real-time measurements and the virtual output data.

Figure 7:
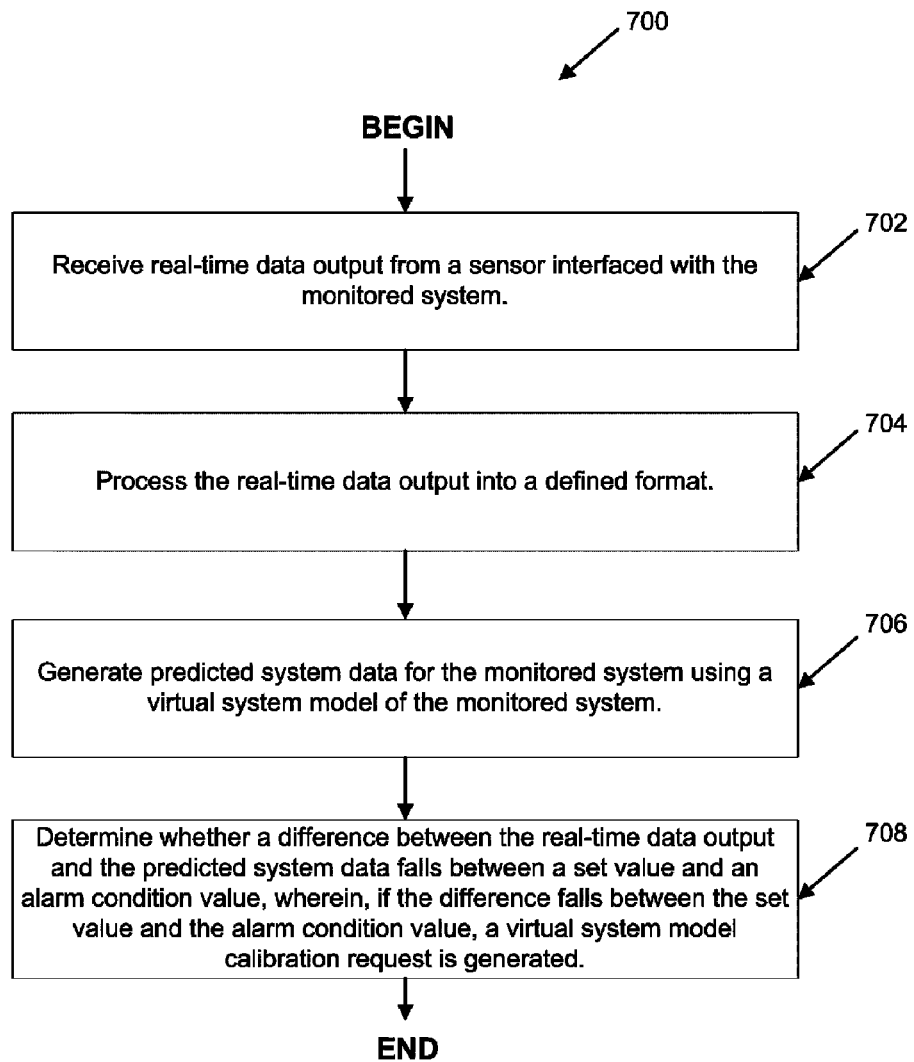
FIG. 7 is an illustration of a flowchart describing a method for managing real-time updates to a virtual system model of a monitored system, in accordance with one embodiment.

FIG. 7 is an illustration of a flowchart describing a method for managing real-time updates to a virtual system model of a monitored system, in accordance with one embodiment. Method 700 begins with operation 702 where real-time data output from a sensor interfaced with the monitored system is received. The sensor is configured to capture output data at split-second intervals to effectuate "real time" data capture. For example, in one embodiment, the sensor is configured to generate hundreds of thousands of data readings per second. It should be appreciated, however, that the number of data output readings taken by the sensor may be set to any value as long as the operational limits of the sensor and the data processing capabilities of the data acquisition hub are not exceeded.

Method 700 moves to operation 704 where the real-time data is processed into a defined format. This would be a format that can be utilized by the analytics server to analyze or compare the data with the simulated data output from the virtual system model. In one embodiment, the data is converted from an analog signal to a digital signal. In another embodiment, the data is converted from a digital signal to an analog signal. It should be understood, however, that the real-time data may be processed into any defined format as long as the analytics engine can utilize the resulting data in a comparison with simulated output data from a virtual system model of the monitored system.

Method 700 continues on to operation 706 where the predicted (i.e., simulated) data for the monitored system is generated using a virtual system model of the monitored system. As discussed above, a virtual system modeling engine utilizes dynamic control logic stored in the virtual system model to generate the predicted output data. The predicted data is supposed to be representative of data that should actually be generated and output from the monitored system.

Method 700 proceeds to operation 708 where a determination is made as to whether the difference between the real-time data output and the predicted system data falls between a set value and an alarm condition value, where if the difference falls between the set value and the alarm condition value a virtual system model calibration and a response can be generated. That is, if the comparison indicates that the differential between the "real-time" sensor output value and the corresponding "virtual" model data output value exceeds a Defined Difference Tolerance (DDT) value (i.e., the "real-time" output values of the sensor output do not indicate an alarm condition) but below an alarm condition (i.e., alarm threshold value), a response can be generated by the analytics engine. In one embodiment, if the differential exceeds the alarm condition, an alarm or notification message is generated by the analytics engine 118. In another embodiment, if the differential is below the DTT value, the analytics engine does nothing and continues to monitor the "real-time" data and "virtual" data. Generally speaking, the comparison of the set value and alarm condition is indicative of the functionality of one or more components of the monitored system.

Figure 8:
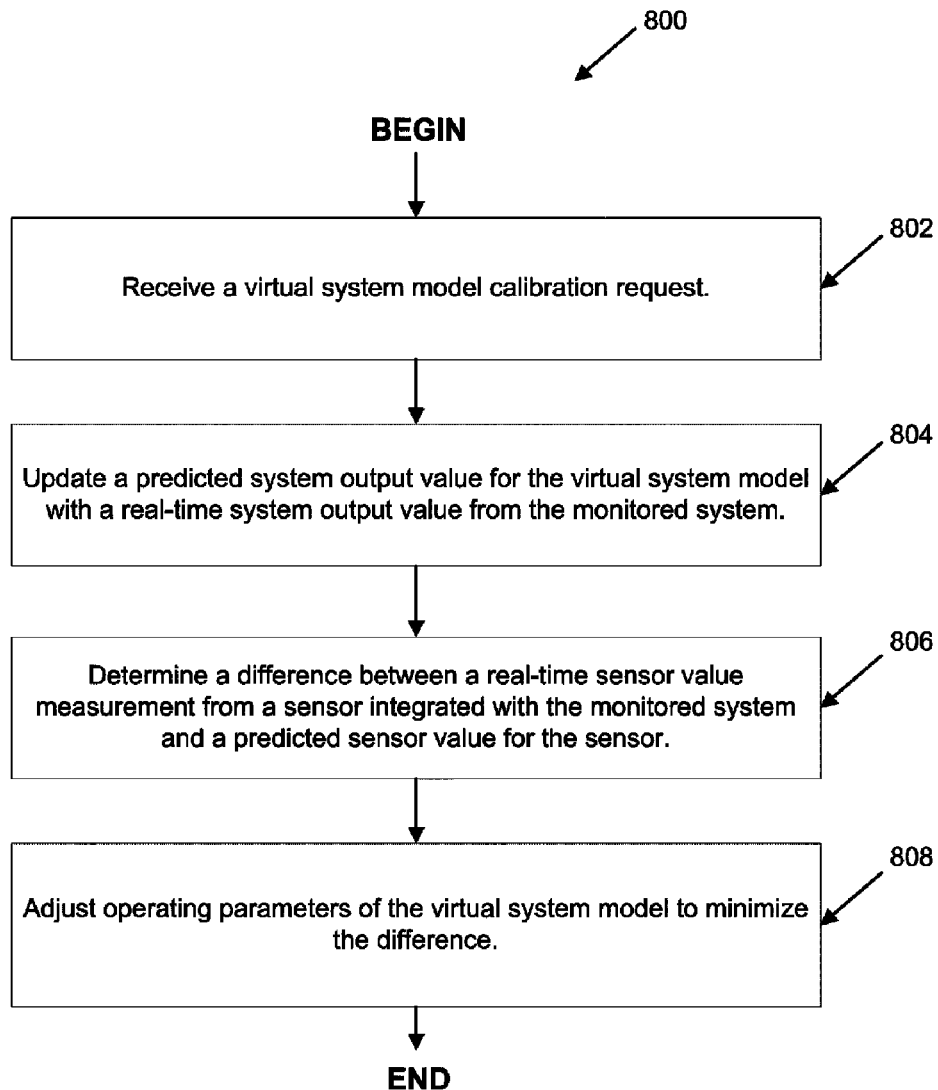
FIG. 8 is an illustration of a flowchart describing a method for synchronizing real-time system data with a virtual system model of a monitored system, in accordance with one embodiment.

FIG. 8 is an illustration of a flowchart describing a method for synchronizing real-time system data with a virtual system model of a monitored system, in accordance with one embodiment. Method 800 begins with operation 802 where a virtual system model calibration request is received. A virtual model calibration request can be generated by an analytics engine whenever the difference between the real-time data output and the predicted system data falls between a set value and an alarm condition value.

Method 800 proceeds to operation 804 where the predicted system output value for the virtual system model is updated with a real-time output value for the monitored system. For example, if sensors interfaced with the monitored system outputs a real-time current value of A, then the predicted system output value for the virtual system model is adjusted to reflect a predicted current value of A.

Method 800 moves on to operation 806 where a difference between the real-time sensor value measurement from a sensor integrated with the monitored system and a predicted sensor value for the sensor is determined. As discussed above, the analytics engine is configured to receive "real-time" data from sensors interfaced with the monitored system via the data acquisition hub (or, alternatively directly from the sensors) and "virtual" data from the virtual system modeling engine simulating the data output from a virtual system model of the monitored system. In one embodiment, the values are in units of electrical power output (i.e., current or voltage) from an electrical power generation or transmission system. It should be appreciated, however, that the values can essentially be any unit type as long as the sensors can be configured to output data in those units or the analytics engine can convert the output data received from the sensors into the desired unit type before performing the comparison.

Method 800 continues on to operation 808 where the operating parameters of the virtual system model is adjusted to minimize the difference. This means that the logic parameters of the virtual system model that a virtual system modeling engine uses to simulate the data output from actual sensors interfaced with the monitored system are adjusted so that the difference between the real-time data output and the simulated data output is minimized. Correspondingly, this operation will update and adjust any virtual system model output parameters that are functions of the virtual system model sensor values. For example, in a power distribution environment, output parameters of power load or demand factor might be a function of multiple sensor data values. The operating parameters of the virtual system model that mimic the operation of the sensor will be adjusted to reflect the real-time data received from those sensors. In one embodiment, authorization from a system administrator is requested prior to the operating parameters of the virtual system model being adjusted. This is to ensure that the system administrator is aware of the changes that are being made to the virtual system model. In one embodiment, after the completion of all the various calibration operations, a report is generated to provide a summary of all the adjustments that have been made to the virtual system model.

The embodiments, described herein, can be practiced with other computer system configurations including hand-held devices, microprocessor systems, microprocessor-based or programmable consumer electronics, minicomputers, mainframe computers and the like. The embodiments can also be practiced in distributing computing environments where tasks are performed by remote processing devices that are linked through a network.

It should also be understood that the embodiments described herein can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations that form part of the embodiments described herein are useful machine operations. The invention also relates to a device or an apparatus for performing these operations. The systems and methods described herein can be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Certain embodiments can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although a few embodiments of the present invention have been described in detail herein, it should be understood, by those of ordinary skill, that the present invention may be embodied in many other specific forms without departing from the spirit or scope of the invention. Therefore, the present examples and embodiments are to be considered as illustrative and not restrictive, and the invention is not to be limited to the details provided therein, but may be modified and practiced within the scope of the appended claims.

What is claimed is:

1. A data processing system for real-time monitoring and predictive analysis of an electrical system under management, comprising:

a calibration and synchronization engine configured to process real-time data indicative of the electrical system status and update a virtual system model of the electrical system in response to a virtual system model calibration request; and an analytics server configured to determine a difference between the processed real-time data indicative of the electrical system status and predicted data generated using the virtual system model, produce a real-time report of the electrical system status in response to the determination, if the difference-is less than an alarm condition value but greater than a set value, generate a virtual system model calibration request, and send the request to the calibration and synchronization engine, and if the difference is greater than the alarm condition value, generate an alarm and prevent updates to the virtual system model.

2. The data processing system for real-time monitoring and predictive analysis of an electrical system under management, as recited in claim 1, wherein the real-time report relates to reliability and availability of the electrical system under management.

3. The data processing system for real-time monitoring and predictive analysis of an electrical system under management, as recited in claim 2, wherein the real-time report is displayed on a thin-client computing device communicatively connected to the analysis server.

4. The data processing system for real-time monitoring and predictive analysis of an electrical system under management, as recited in claim 1, wherein the real-time report relates to capacity and voltage stability of electrical distribution lines of the electrical system.

5. The data processing system for real-time monitoring and predictive analysis of an electrical system under management, as recited in claim 1, wherein the real-time report relates to power flow and loading of electrical distribution lines of the electrical system.

6. The data processing system for real-time monitoring and predictive analysis of an electrical system under management, as recited in claim 1, wherein the real-time report relates to dynamic behavior response and strength of the electrical system as a function of system exposure to external conditions.

7. The data processing system for real-time monitoring and predictive analysis of an electrical system under management, as recited in claim 1, wherein the real-time report relates to arc flash energy and arc heat exposure.

8. The data processing system for real-time monitoring and predictive analysis of an electrical system under management, as recited in claim 1, wherein the analytics server receives data from a plurality of system sensors providing real-time data relating to components of the electrical system.

9. The data processing system for real-time monitoring and predictive analysis of an electrical system under management, as recited in claim 8, wherein the analytics server receives data from a virtual model database that provides values that relate to the virtual model and that correspond to the real-time data received from the system sensors.

10. A method for real-time monitoring and predictive analysis of an electrical system under management, comprising:

processing real-time data indicative of the electrical system status to enable a virtual model of the electrical system under management to be calibrated and synchronized with the real-time data and to generate predicted data for the electrical system;

analyzing a difference between the real-time data and the predicted data;

producing a real-time report of the electrical system status in response to the analysis;

if the difference is less than an alarm condition value but greater than a set value, updating the virtual model of the electrical system under management in response to the real-time data to calibrate the virtual model, if the difference is greater than the alarm condition value, generating an alarm and preventing updates to the virtual model.

11. The method for real-time monitoring and predictive analysis of an electrical system under management, as recited in claim 10, wherein the real-time report relates to reliability and availability of the electrical system.

12. The method for real-time monitoring and predictive analysis of an electrical system under management, as recited in claim 10, the real-time report relates to capacity and voltage stability of electrical distribution lines of the electrical system.

13. The method for real-time monitoring and predictive analysis of an electrical system under management, as recited in claim 10, wherein the real-time report is displayed on a thin-client computing device.

14. The method for real-time monitoring and predictive analysis of an electrical system under management, as recited in claim 10, wherein the real-time report relates to power flow and loading of electrical distribution lines of the electrical system.

15. The method for real-time monitoring and predictive analysis of an electrical system under management, as recited in claim 10, wherein the real-time report relates to dynamic behavior response and strength of the electrical system as a function of system exposure to external conditions.

16. The method for real-time monitoring and predictive analysis of an electrical system under management, as recited in claim 10, wherein the real-time report relates to arc flash energy and arc heat exposure.

17. A data processing system for real-time monitoring and predictive analysis of a monitored system, comprising:

a calibration and synchronization engine configured to process real-time data indicative of the monitored system status and update a virtual model of the monitored system in response to a virtual model calibration request; and an analysis server configured to determine a difference between the processed real-time data indicative of the monitored system status and predicted data generated using the virtual model, if the difference is less than an alarm condition value but greater than a set value, generate a virtual model calibration request and send the request to the calibration and synchronization engine, and if the difference is greater than the alarm condition value, generate an alarm and prevent updates to the virtual model.

18. A method for real-time monitoring and predictive analysis of a monitored system, comprising:

processing real-time data indicative of the monitored system status to enable a virtual model of the monitored system under management to be calibrated and synchronized with the real-time data;

determining a difference between the processed real-time data indicative of the monitored system status and corresponding output values of the virtual model;

if the difference is less than an alarm condition value but greater than a set value, updating the virtual model; and if the difference is greater than the alarm condition value, generating an alarm and preventing updates to the virtual model.

* * * * *